R. B. RICE.
VARIABLE SPEED GEARING.
APPLICATION FILED JAN. 20, 1916.
1,214,369.
Patented Jan. 30, 1917.
2 SHEETS—SHEET 2.
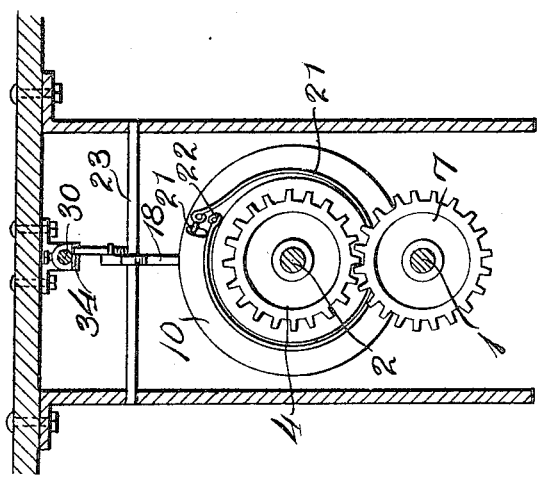
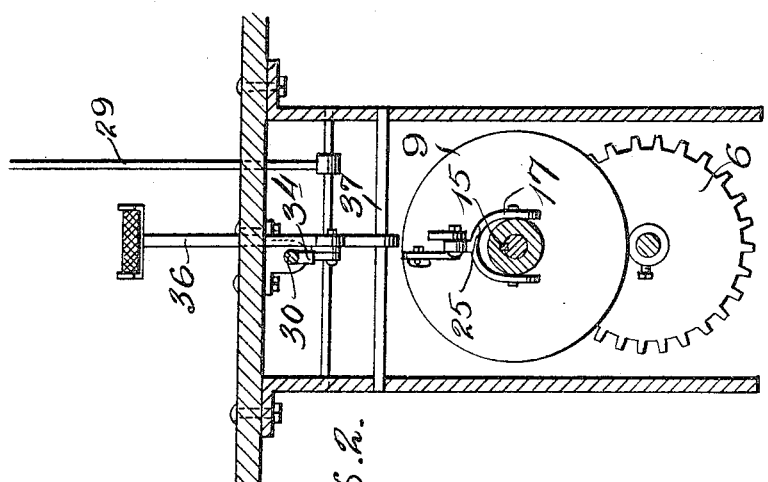
INVENTOR
Richard B. Rice.
WITNESSES
Edw. S. Hall.
W. F. Kellogg.
BY Richard Owen.
ATTORNEY

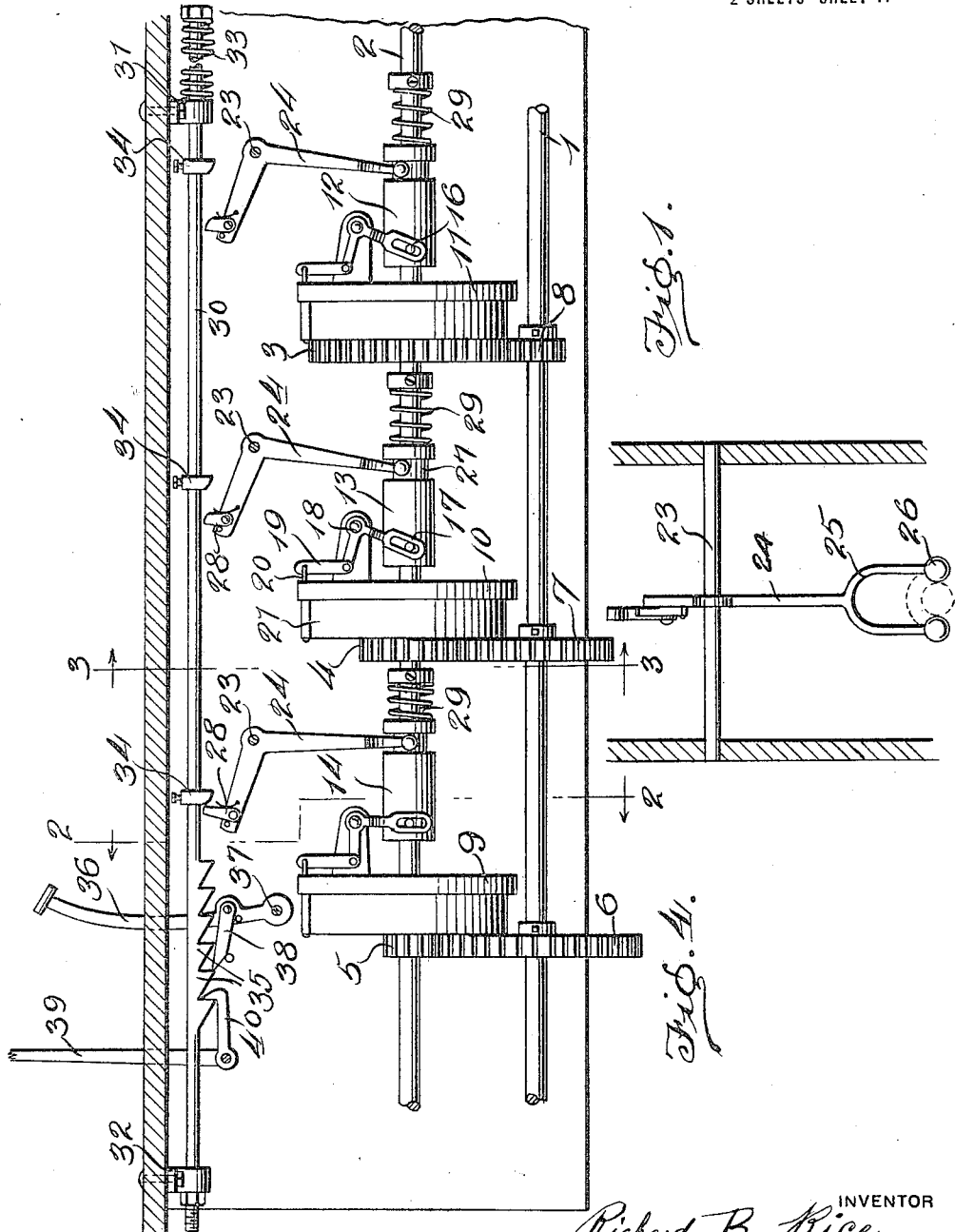

UNITED STATES PATENT OFFICE.

RICHARD B. RICE, OF ROCHESTER, NEW YORK.

VARIABLE-SPEED GEARING.

1,214,369.

Specification of Letters Patent.  Patented Jan. 30, 1917.

Application filed January 20, 1916. Serial No. 73,224.

*To all whom it may concern:*

Be it known that I, RICHARD B. RICE, a citizen of the United States, residing at Rochester, in the county of Monroe and State of New York, have invented certain new and useful Improvements in Variable-Speed Gearings, of which the following is a specification.

This invention relates to power transmitting mechanism and more particularly, has for its object the provision of a transmission mechanism wherein the speed may be varied at will by the operator.

A further object of the invention is to provide a variable speed mechanism in which the gears are constantly in mesh, thereby, obviating the danger of stripping the teeth when shifting the same.

A still further object of the invention, resides in the provision of a clutch member for connecting the gear in operative relation to the driven shaft, in such a manner, as to prevent the disagreeable jerking, experienced when the clutch member is of rigid construction.

Also the improvements embody a novel arrangement whereby the various speeds may be successively operated by a single lever, which is moved in but one direction, this construction, overcoming the heretofore difficult and intricate procedure employed for the shifting of the gears from one speed to another.

Other improvements and novel details in the construction and arrangement of the various parts of the apparatus will be brought out more in detail in the description to follow, which, for a clear understanding of the invention, should be considered in connection with the accompanying drawings forming a part hereof, wherein is disclosed for the purpose of illustration, convenient and satisfactory embodiments of the invention.

In the drawings: Figure 1 is a side elevation of the transmitting mechanism, Fig. 2 is a view taken on line 2—2 of Fig. 1, Fig. 3 is a view taken on line 3—3 of Fig. 1, and Fig. 4 is a detailed view of the clutch shifting mechanism.

Referring now more specifically to the drawings, wherein like reference characters refer to corresponding parts throughout the several views, 1 is a driving shaft, 2 a driven shaft, having gears 3, 4 and 5 loosely mounted thereupon, each of the gears being adapted to be constantly in mesh with gears 6, 7 and 8 keyed to the drive shaft 1. Arranged adjacent the gears 3, 4 and 5 and secured thereto are annular collar members 9, 10 and 11 which are adapted to rotate therewith.

12, 13 and 14 are sliding sleeves which are keyed to the driven shaft by suitable keys 15, the said sliding sleeves being provided with, at one end, lugs 16 which are adapted to receive yoke members 17 of a bell crank lever 18, and which is connected thereto by means of a suitable pivot and link portion 19 which is adapted to engage a rod 20 having connected thereto a flexible band 21 which extends circumferentially about the collar 10 and having its free end attached thereto at 22 by suitable fastening devices. Pivotally supported at 23 are bell crank levers 24 having bifurcated end portions 25, the said bifurcated end portions being provided with curved bearing surfaces 26 which are adapted to be received by a recess portion 27 arranged in the sliding sleeves 12, 13 and 14, the said bell crank levers 24 having arranged at their free ends pivoted pawls or lugs 28. Coiled springs 29 are arranged adjacent one end of the sliding sleeve members for a purpose as will be hereinafter described. Means are provided for operating the clutch members in the form of a sliding rod 30 mounted in suitable bearings 31 and 32 and having arranged at one end a spring 33.

34 are lug members secured to the sliding rod 30 by screws or other detachable means, and 35 is a serrated portion formed upon the rod 30 serving as ratchet members.

36 is a foot lever pivotally supported at 37 and having arranged thereon a pivoted pawl 38 which is adapted to be engaged by the ratchet members 35, and 39 is a second lever pivotally supported and having arranged thereon a pawl 40.

Coming now to the operation of the device it will be said, for the purpose of illustration, that the operator desires to operate the gears so as to obtain high speed. A pressure will be brought to bear upon the foot lever 36, which in turn will be moved upon its pivot 37 and in doing so will cause the pawl 38 to engage but one of the ratchet members 35 thereby forcing the same forward whereupon the pawl 40 will receive the ratchet member previously engaged by the pawl 38, as shown in Fig. 1. The lever 36 is then retracted so as to bring the pawl 38 into engagement with a second ratchet member, forcing the same forward where it is received by the retaining pawl 40, while the foot lever is again retracted, the pawl 38 engaging a third ratchet member and is again forced forward. In this position it will be obvious that the lug member 34 will engage the pivoted lug 28 and in doing so will force the bell crank lever 24 down causing the sleeve 12 to be moved backward against the tension of the spring 29, which movement will operate the yoke member 17 of the bell crank lever 18, and reciprocate the link portion 19 so as to cause the flexible band 21 to be tightened upon the collar 11 which action will cause that member to be rotated, and in doing so will also rotate the gear 3, the drive then being through the shaft 1 and gear 8 to the gear 3 from whence it will be transmitted to the driven shaft 2 which may be connected with the differential or other driving gear of the device upon which the mechanism is to be employed. In obtaining the intermediate speed, the same operation is repeated, with the exception that the sliding rod is moved but twice and in doing so causes the second lug member 34 to be engaged with the bell crank lever 24 thereby operating the sliding sleeve 13 against the tension of the spring 29 which will in turn, through the medium of the bell crank lever 18 and link 19, connect the flexible band 21 with the collar 10, the drive then being through the shaft 1 and gear 7 to the gear 4 and driven shaft 2. It will be seen that as the sliding rod 30 is moved forward the first lug arranged thereon will engage with the bell crank lever 24 which is connected with a low speed gearing and upon continuing movement thereof, will cause the bell crank lever 24 of the low speed gearing to be further depressed against the tension of the spring 29 so as to allow for the passing of the first lug and whereupon the second lug will be then brought into engagement with the bell crank lever 24 of the intermediate speed gearing so as to operate that member against the tension of the spring and upon continued movement of the rod 30 will also, cause the bell crank lever of the intermediate speed gearing to be depressed against the tension of the spring 29 allowing the second lug to pass and whereupon the third lug will be engaged with the bell crank lever of the high speed gearing. The sliding operating rod, when not in operation, is forced back by means of the expanding spring 33 so as to bring each of the lugs out of engagement with the bell crank levers 24 and is held normally in such inoperative position, by means of said spring.

Having thus described the invention what I claim is:—

1. Power transmission means, including parallel driving and driven shafts, gears of varying size fixedly mounted on one of the shafts, corresponding gears loosely mounted on the other shafts and in mesh with the fixedly mounted gears, clutch means for connecting said loosely mounted gears with their respective shaft, bell crank levers engaged with said clutch means for operating the same, a slidable rod having a series of lugs thereon adapted to engage the bell crank levers to selectively connect the clutch means with the loosely mounted gears, and means engaged with the slidable rod for facilitating the manipulation thereof.

2. Power transmission means, including parallel driving and driven shafts, gears of varying size fixedly mounted on one of the shafts, corresponding gears loosely mounted upon the other shaft and in mesh with the fixedly mounted gears, drums carried by said loosely mounted gears, flexible clutch members arranged about said drums and connected with said other shaft, bell crank levers engaged with the clutch members for tightening the same upon said drums, a sliding rod having a series of lugs thereon adapted to engage the bell crank levers to connect the clutch members with the drums of the loosely mounted gears, and pawl and ratchet mechanism for operating said sliding rod.

3. Power transmission means, including driving and driven shafts, gears of varying size fixedly mounted on one of the shafts, corresponding gears loosely mounted upon the other shaft and in mesh with the fixedly mounted gears, clutches connected with said other shaft and engageable with the loosely mounted gears, a plurality of bell crank levers engageable with said clutches, a slidable rod carrying a plurality of spaced apart lugs adapted for engagement with the bell crank levers to move the same for operating said clutches, and means engageable with said slidable rod for operating the same.

4. The combination of parallel driving and driven shafts, of gears of varying size fixedly mounted on one of the shafts, corresponding gears loosely mounted on the other shaft each in mesh with a fixed gear, clutch members carried by and connected to said other shaft, means for normally maintaining said clutches in inoperative position, means engageable with the clutch members for moving the same into operative positions, a slidable rod, a plurality of lugs adjustably mounted upon said rod and adapted for engagement with said clutch moving means for actuating the same, and means engageable with the slidable rod for operating the same.

5. The combination of parallel driving and driven shafts, of gears of varying size fast on one of the shafts, corresponding gears loosely mounted on the other shaft, each in mesh with a fixed gear, drums carried by said loosely mounted gears, flexible clutch members disposed about said drums, slidable means arranged upon and connected to said other shaft and connected to the flexible clutch members, means engaged with said slidable means for moving the same into operative position and tightening the flexible clutches about the drums, means for normally maintaining the slidable means in inoperative position, a slidable rod, a plurality of spaced apart lugs adjustably mounted on said slidable rod adapted to engage said means for operating the slidable means whereby to independently connect the clutch members to their respective drums, and means engageable with the slidable rod for operating the same.

In testimony whereof I affix my signature in presence of two witnesses.

RICHARD B. RICE.

Witnesses:
STEPHEN S. HOLLOWAY,
THOMAS Y. GIBSON.

Copies of this patent may be obtained for five cents each, by addressing the "Commissioner of Patents, Washington, D C."